(12) United States Patent
Van Den Berg et al.

(10) Patent No.: US 8,528,143 B2
(45) Date of Patent: Sep. 10, 2013

(54) DEVICE FOR REMOVING MANURE FROM A FLOOR

(75) Inventors: Karel Van Den Berg, Bleskensgraaf (NL); Jan Lambertus Pastoor, Rijswijk (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/211,344

(22) Filed: Aug. 17, 2011

(65) Prior Publication Data

US 2011/0296636 A1    Dec. 8, 2011

Related U.S. Application Data

(63) Continuation of application No. PCT/NL2010/000022, filed on Feb. 12, 2010.

(30) Foreign Application Priority Data

Feb. 17, 2009  (NL) .................................. 1036580

(51) Int. Cl.
 *A47L 11/00*   (2006.01)
(52) U.S. Cl.
 USPC .............................. 15/50.1; 15/49.1; 15/93.1
(58) Field of Classification Search
 USPC ............................ 15/49.1, 50.1, 93.1, 98, 319
 See application file for complete search history.

(56) References Cited

U.S. PATENT DOCUMENTS 7,032,682 B2 * 4/2006 Berg .................................. 172/5

FOREIGN PATENT DOCUMENTS

| DE | 4343760 A1 | 6/1995 |
| EP | 1690450 A1 | 8/2006 |
| GB | 1414163 | 11/1975 |
| WO | 9816099 A1 | 4/1998 |
| WO | 0070937 A1 | 11/2000 |

OTHER PUBLICATIONS

International Search Report issued on Apr. 12, 2010.

* cited by examiner

*Primary Examiner* — Shay Karls
(74) *Attorney, Agent, or Firm* — Hoyng Monegier LLP; Coraline J. Haitjema; David P. Owen

(57) ABSTRACT

The present invention relates to an unmanned self-propelled and self-steering device for removing manure present on a floor, including a manure slide with a sliding wall which, when viewed in the customary direction of travel of the device, forms a first contact surface for manure present on the floor, and comprising a drive device for the travelling over the floor, wherein the drive device comprises a rotatingly driven drive which is in driving engagement with the floor during operation and which is located in front of the sliding wall.

35 Claims, 4 Drawing Sheets

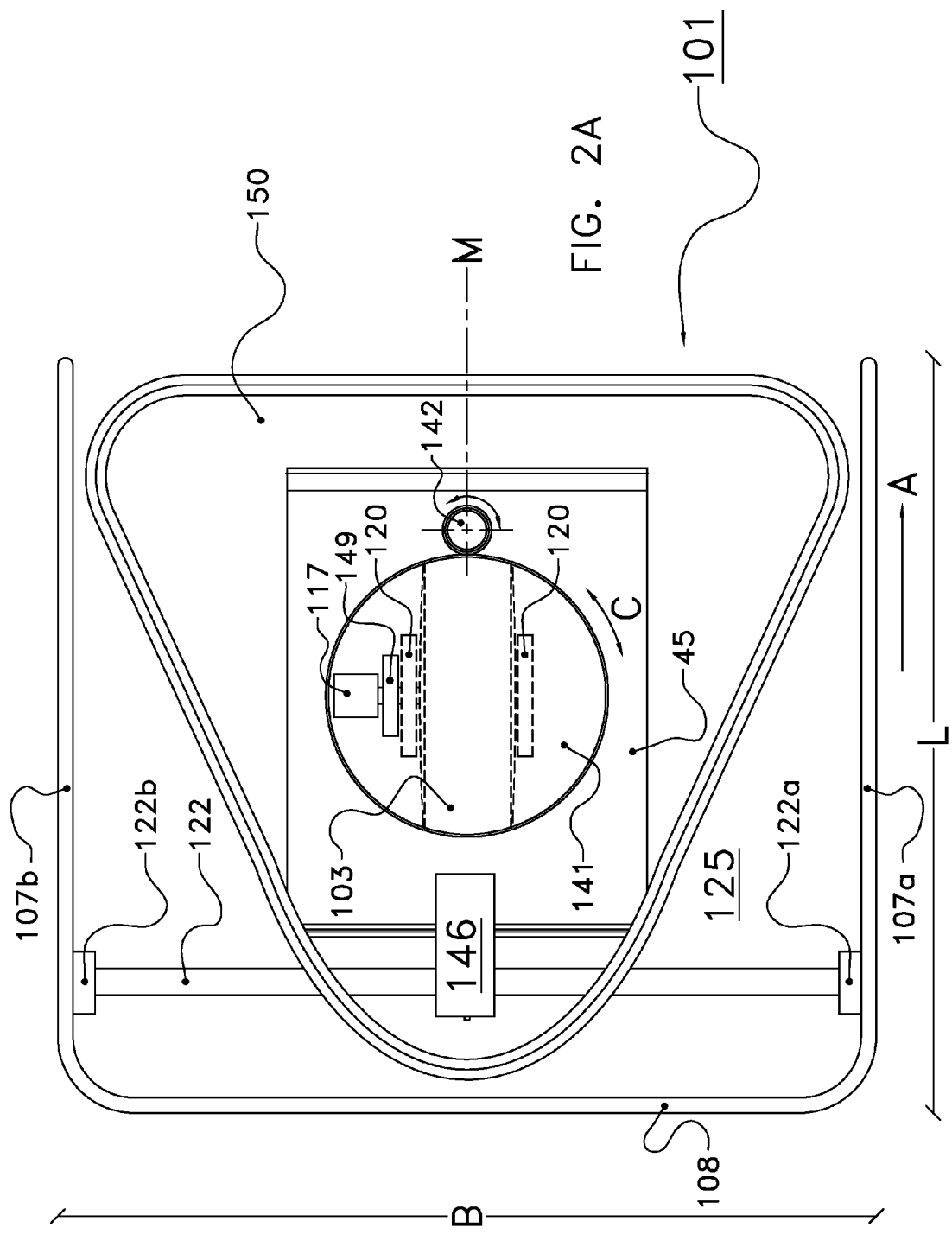

DEVICE FOR REMOVING MANURE FROM A FLOOR

CROSS REFERENCE TO RELATED APPLICATIONS

This is a continuation of PCT/NL2010/000022 filed on 12 Feb. 2010, which claims priority from Netherlands patent application no. 1036580 filed 17 Feb. 2009, the contents of both applications are hereby incorporated by reference in their entireties.

BACKGROUND OF THE INVENTION

1. Field of the Invention

The invention relates to a device for removing manure from a floor. The invention relates in particular to such a device which is autonomously displaceable, i.e. provided with self-driving and self-steering.

2. Background of Related Art

From WO 00/70937, which is hereby incorporated by reference in its entirety, a device for removing manure from a floor is known, which is provided with a frame on which a manure slide (also called scraper) and a motor-driven drive wheel are mounted. The drive wheel is located behind the manure slide. During operation, the device is supported on the manure slide and on the drive wheel.

EP 1.690.450, which is hereby incorporated by reference in its entirety, shows a comparable device, wherein two drive wheels or drive caterpillars are disposed behind the manure slide (scraper), on both sides of a block in which the motor is accommodated. Steering takes place by actuating the two wheels individually or by means of an added small steering wheel. In front of the slide there is disposed a sliding shoe by means of which obstacles projecting from the floor, such as bolts or thresholds, can be overcome.

DE 103 09 196, which is hereby incorporated by reference in its entirety, shows a device for removing manure from a floor, in the form of a tricycle with motor-driven wheels at the rear, on both sides of a frame, and a steering wheel at the front. Two manure slides (scrapers) are located between the rear wheels and the front wheel.

There is further known a so-called auto-slide, which comprises a front manure slide and a rear manure slide (scraper) which is transverse to the direction of travel, which slides are interconnected by a longitudinal girder on which a drive device is provided as well.

SUMMARY OF THE INVENTION

In order to overcome one or more disadvantages of the prior art, the present invention provides an unmanned self-propelled and self-steering device for removing manure present on a floor, which is provided with an alternative drive.

In another embodiment of the present invention, the device is provided with an alternative steering.

In a further embodiment of the present invention, the device provides a mechanism to minimize the hindrance of projections on the floor can be limited.

In yet another embodiment of the present invention, the device is compact.

In accordance with various aspects of the present invention, an unmanned self-propelled and self-steering device for removing manure present on a floor is provided, comprising a manure slide with a sliding wall which, when viewed in the customary direction of travel of the device, forms a first contact surface for manure present on the floor, and comprising a drive device for the travelling over the floor, wherein the drive device comprises a rotatingly driven drive which is in driving engagement with the floor during operation and which is located in front of the sliding wall. Hereby the manure slide is moved forwards, the greatest resistance then being located behind the drive.

In a simple embodiment, the drive for the device is single, such as in the form of a single wheel or a double wheel which forms a driven unit.

In a compact embodiment, the drive also forms a steering member, which is preferably rotatable as a unit about a substantially vertical centre line. Driving and steering can then take place by one and the same component.

The manure slide can form a manure-accommodating-space which opens in forward direction and is confined in rearward direction by the sliding wall, wherein the drive is located within the accommodation space. The length of the device can thus be utilized for accommodating manure and projecting components need hardly be present. Alternatively, if the manure slide forms a manure-accommodating-space which opens in forward direction and is confined in rearward direction by the sliding wall, the drive can be located near the opening of the manure-accommodating-space.

The accommodation space can be substantially U-shaped or V-shaped, in which case the legs can enhance the stability of the device. In this case, the manure slide can have two legs for forming the U-shape or V-shape, whose ends extend to at least near the front of the device, the drive being located behind the ends of the legs. The accommodation space can be relatively large, cover a large part of the device in top view, such as, for example, if the two legs have a length in the order of magnitude of the width of the manure slide. The device is then able to accommodate the manure of one working stroke over so-called closed floors and deliver same at an end of a passage(manure)way.

The two legs can have a length which is greater than half, preferably greater than ⅔, of the overall length of the device. The largest dimension of the accommodation space in longitudinal direction of the device can amount to the order of magnitude of the width of the manure slide.

In another embodiment, the unmanned self-propelled and self-steering device for removing manure present on a floor, comprises a manure slide with a sliding wall and a drive device for the travelling over the floor, wherein the drive device comprises a single, rotatingly driven drive which is in driving engagement with the floor and which also forms a steering member. Driving and steering can then take place by one and the same component, in a compact device.

As described above, in this case, the drive can advantageously be located in front of the sliding wall, wherein the manure slide forms a manure-accommodating-space which opens in forward direction and is confined in rearward direction by the sliding wall, wherein the drive is located within the accommodation space or is located near the opening of the manure-accommodating-space. The accommodation space can be substantially U-shaped or V-shaped, in particular reach the above described dimension.

The following of the floor can be enhanced if the legs of the U-shaped or V-shaped manure slide are plate-shaped and the manure slide is provided with means for enabling a mutual rotation (mutual rotation mechanism) of at least a portion of the lower edges of the legs in a vertical plane in which the portion concerned is located. The legs of the manure slide can, for example, be deformable in their plane, in particular as a result of the fact that constructive measures for this purpose, such as slots, have been taken in the legs of the manure slide. Alternatively, the manure slide can comprise a rear wall which is deformable about a centre line transverse to a central longitudinal plane of the manure slide.

In an embodiment which is compact in transverse direction, the drive is located in a central longitudinal plane of the device.

In one embodiment, the device according to the invention comprises a frame, wherein the drive is fastened to the frame by a first connection, wherein the manure slide is fastened to the frame by a second connection, wherein the second connection is located behind the first connection. The second connection can comprise a hinge with a substantially horizontal centre line transverse to the longitudinal direction, as a result of which the contact of the manure slide with the floor is enhanced.

In a simple embodiment thereof, the second connection has only one horizontal hinge centre line, preferably located on the manure slide, so that a low point of rotation is obtained.

In an alternative embodiment, the second connection forms a parallelogram connection.

Lateral stability is enhanced if the second connection engages the manure slide in at least two locations which are in transverse direction at a distance from each other.

The second connection can engage the manure slide by a hinge connection, which hinge connection has a substantially horizontal rotational centre line which is perpendicular to a central longitudinal plane of the device, wherein the sliding wall has an upper edge, wherein the rotational centre line is located below at least a portion of the upper edge of the sliding wall.

One of ordinary skill in the art will appreciate that by unmanned self-propelled and self-steering devices are meant both at least substantially autonomously travelling and (freely) steering devices, whether or not programmed for this purpose, such as the Discovery (registered trademark) manure slide of the registered trademark Lely, and devices in which the travelling and/or steering are/is remotely controlled. In both cases, a motor for the travelling of the device is provided in the device.

BRIEF DESCRIPTION OF THE DRAWINGS

The features and advantages of the invention will be appreciated upon reference to the following drawings, in which:

FIGS. 2A and 2B show a top view and a side view, respectively, one embodiment of a device according to the invention.

DETAILED DESCRIPTION OF ILLUSTRATIVE EMBODIMENTS

Figure 1A:
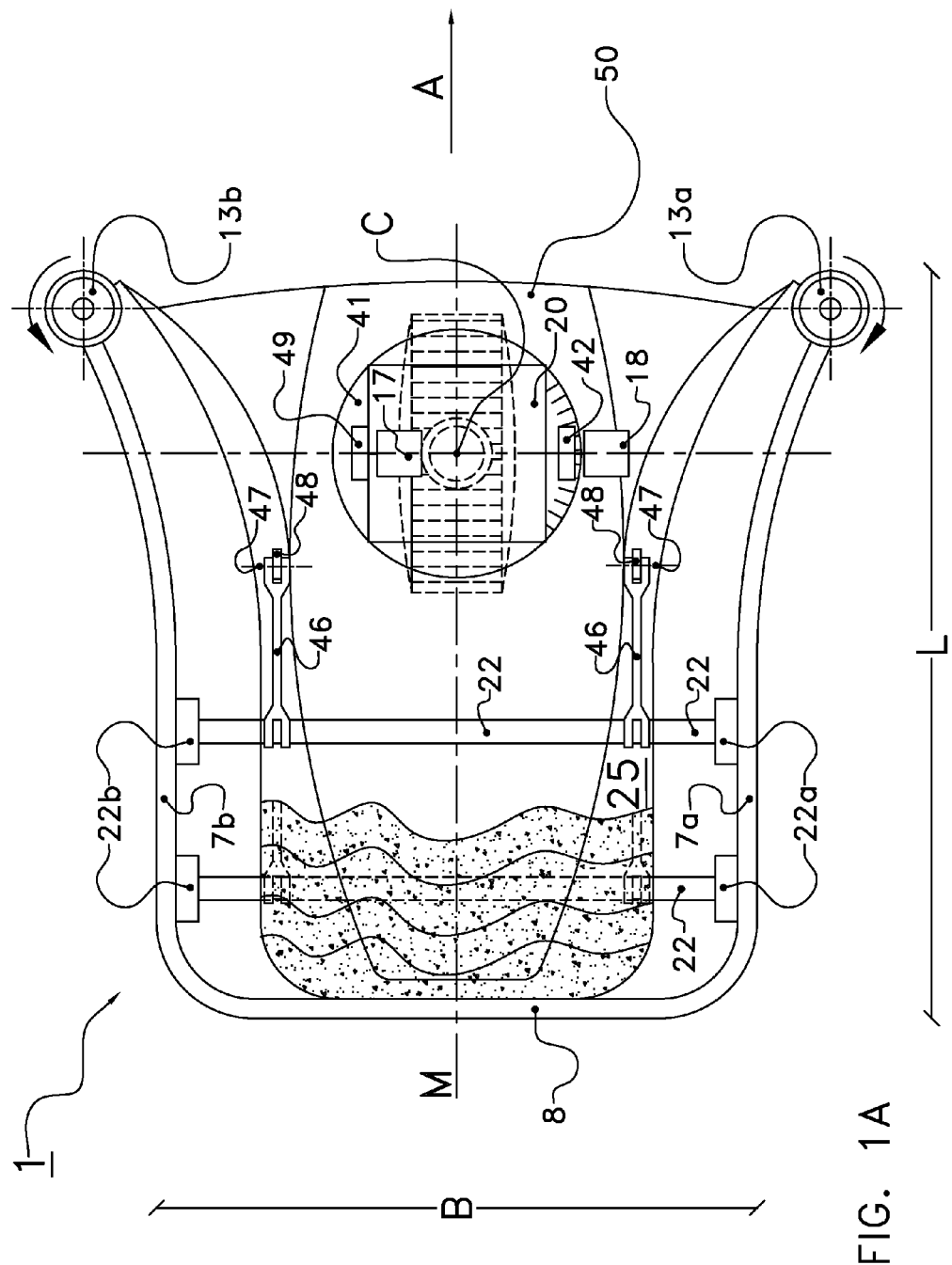
FIGS. 1A and 1B show a top view and a side view, respectively, of one embodiment of a device according to the invention.
Figure 1B:
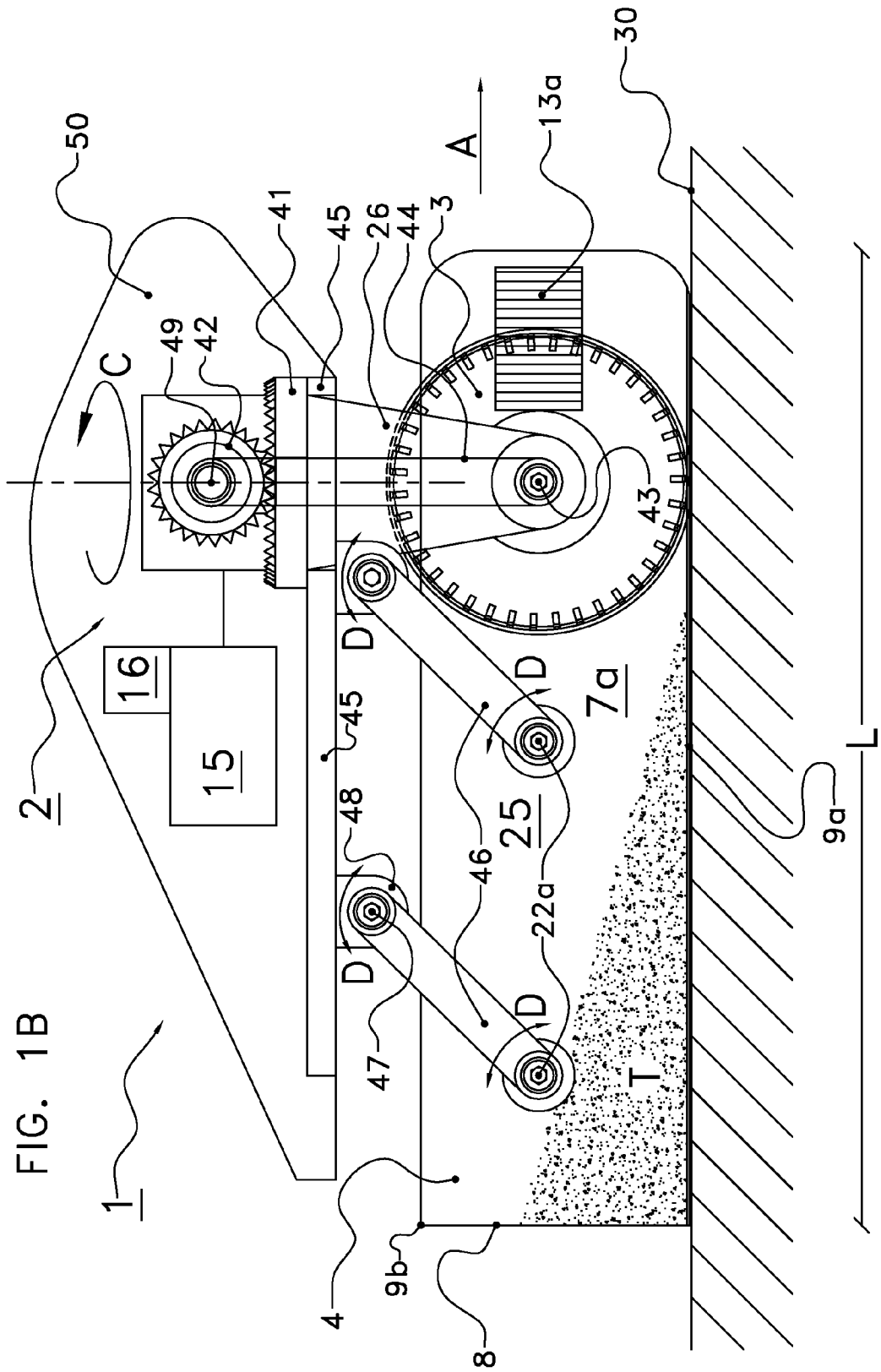

The features and advantages of the invention will be appreciated upon reference to the following drawings, in which: the device 1 shown in FIGS. 1A and 1B for removing manure from a floor 30 of a passageway of a stable comprises a central longitudinal plane M and a drive and control member 2, a large part of which is accommodated in a hood 50, and a manure slide or scraper 4 which is substantially U-shaped with plate-shaped legs 7a,b and plate-shaped rear wall or sliding wall 8, which define a manure-accommodating-space 25 between them. The rear wall 8 can distort to some extent about a horizontal centre line transverse to the central longitudinal plane M, so that the legs 7a,b can pivot to some extent in their plane. The length L and the width B are substantially defined by the manure slide 4. The width B can for example be 0.5 m to 1 m, and the length L for example 1 m. The manure slide 4, in particular the sliding wall 8, has a lower edge 9a, where a polyurethane strip is provided for a proper contact with the floor 30, and an upper edge 9b. In the area of the entrance opening O of the manure-accommodating-space 25, there is a centrally arranged drive wheel 3 for the device 1. The device 1 is supported on the floor 30 by said wheel 3 and the manure slide 4.

The hood 50 is mounted on a frame plate 45 on which a gearwheel 41 is bearing-supported in a pivotable manner (direction C). By a gearwheel 42 driven by an electric motor 18 controlled by a control unit 15, the gearwheel 41 can be pivoted in order to move the device 1 over the floor.

On the gearwheel 41 there is disposed an electric motor 17 which drives a pulley 49 and therewith a belt 44 by which the single, central wheel 3 is driven, in the desired direction. The wheel 3 is rotatably bearing-supported about a horizontal centre line at the lower end of a fork 20 which forms a rotatable unit with the gearwheel 41. A pulley 43 is rotationally fixed with the wheel 3 and is driven by the belt 44.

The electric motor 17 is controlled by the control unit 15. The control unit 15 is capable of being programmed remotely, so that the device 1 can follow autonomously a defined working route, in a repeating manner. The electric motors are fed by an accumulator 16 which can be charged at a non-shown stationary charging station.

The upper ends of two pairs of link rods 46 are fastened by means of pivot pins 47 in a rotatable manner (direction D) to the lower side of the frame plate 45, at the location of brackets 48, which rods 46 are fastened to cross-bars 22 in a rotatable manner as well (direction D). The cross-bars 22 are fastened to the legs 7a,b of the manure slide 4 at the location of 22a,22b. Alternatively, the rotatability (D) can be effected at said ends 22a,b. In both cases, there is formed a parallelogram construction in which the manure slide 4 is displaceable as a whole in a parallel manner (direction B) with respect to the frame plate 45. The rotational centre line of the connection at the location of the lower ends of the rods 46 is located below the upper edge 9b of the sliding wall 8. The frame plate 45 is kept at a distance above the manure slide 4 by non-shown double-acting torsion springs which are disposed at the location of the pivot pins 47 and tighten the link rods 46 to the depicted position. Alternatively, it is possible to dispose a number of blocks of elastic material between the manure slide 4 and the frame plate 45.

Rollers 13a,b are provided at the front of the legs 7a,b, in order not to impede the movement of the device 1 too much in the case of contact with a wall.

After the control unit 15 has been programmed and the accumulator 16 has been charged, it is possible for the device 1 to travel and steer autonomously along programmed trajectories during operation. As the width B will amount to a part of the width of the passageway, it will be necessary to travel over the passageway several times, in parallel paths. The manure-accommodating-space 25 can be so large that all the manure present in the path to be covered on a closed floor 30 (manure accumulation T) can be taken along to the end of the passageway where the entrance opening of a manure pit is located. Despite the fact that the size of the manure-accommodating-space is large with respect to the state of the art, the device 1 is compact and has a high manoeuvrability.

Figure 2B:
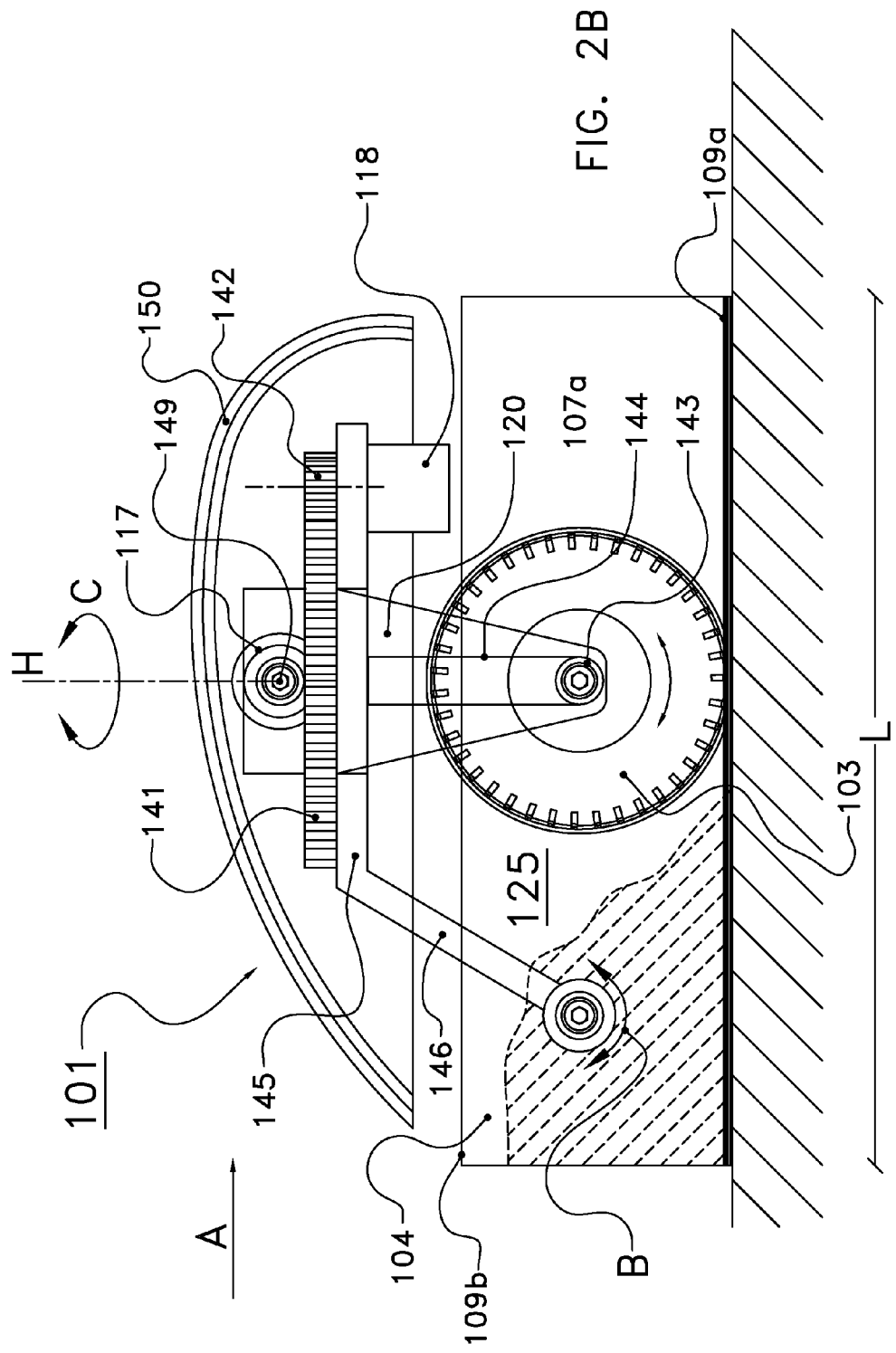

The device 101 depicted in FIGS. 2A and 2B corresponds to a large extent to that of FIGS. 1A and 1B, the outer dimensions being defined by the manure slide proper 104, L,B. The legs 107a,b are fastened in a freely rotatable manner (direction D) to the ends 122a,b of a cross-bar 122 at a location behind the wheel 103. The cross-bar 122 itself is bearing-supported in a freely rotatable manner, at a location below the upper edge 109b of the legs 107a,b, at the lower end of a downwardly and rearwardly extending rigid strip 146 which is fixed to a horizontal frame plate 145. A gearwheel 141 is supported on the frame plate 145 in a manner in which it is rotatable about a vertical centre line H (direction C). The gearwheel 141 engages pinion 142 which is driven by electric motor 118. The gearwheel 141 is provided with an electric motor 117 which drives a pulley 149 and therewith a belt 144 by which a pulley 143, which is rotationally fixed with the single, central wheel 103, is driven, in the desired direction. The wheel 103 is mounted, in a manner in which it is rotatable about a horizontal centre line, in a fork 120 which forms a unit, rotatable about a vertical centre line (direction H), with the gearwheel 141. The drive and the manure-accommodating-space 125 are upwardly screened by a hood 150.

The rear wall 108 can distort to some extent about a horizontal centre line transverse to the central longitudinal plane M. The device 101 is supported on the floor by the manure slide 104 and the wheel 103. The centre of gravity Z of the upper construction is situated at a short horizontal distance behind the centre line H. The centre line of the connection at the location of the lower end of the strip 146 is located below the upper edge 109b of the sliding wall 108.

During operation, when the device 101, like the device 1 of FIGS. 1A and 1B, is travelling and steering in an autonomous manner, manure will be accommodated in the accommodation space 125 which is defined by the legs 107a,b and rear wall 108. By means of the rotational connection at the location of the bar ends 122a,b, the manure slide 104 is able to properly follow the floor 30 in direction A. In this case it is advantageous that the point of rotation is located below the upper edge of the manure slide 104. By means of the electric motor 118 the wheel 103 can be rotated in directions C in order to steer the device 101. The electric motors 117 and 118 can be controlled by a non-shown control unit, as described in the foregoing.

Due to the position of the drive wheel 3,103 in front of the rear wall 8,108 of the manure slide, said wall will be urged against the floor to a greater extent when the device 1,101 accelerates, so that the slide function is enhanced.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An unmanned self-propelled and self-steering device for removing manure present on a floor, comprising a manure slide with a sliding wall that forms a first contact surface for manure present on the floor when viewed in the customary direction of travel of the device, and comprising a drive device for the travelling over the floor, wherein the drive device comprises a rotatingly driven drive that is in driving engagement with the floor during operation and is located in front of the sliding wall,
wherein the drive for the device is a single drive, and
wherein at least one of: the device is self-steering, and the drive also forms a steering member, the drive being rotatable as a unit about a substantially vertical centre line, and
wherein the manure slide forms a manure-accommodating-space that opens in forward direction and is confined in rearward direction by the sliding wall, wherein the drive is located within the accommodation space.

2. The device according to claim 1, wherein the manure slide forms a manure-accommodating-space that opens in forward direction and is confined in rearward direction by the sliding wall, wherein the drive is located near the opening of the manure-accommodating-space.

3. The device according to claim 1, wherein the accommodation space is substantially U-shaped or V-shaped.

4. The device according to claim 3, wherein the manure slide has two legs for forming the U-shape or V-shape, wherein the two legs have ends which extend to at least near the front of the device, wherein the drive is located behind the ends of the legs.

5. The device according to claim 4, wherein the two legs have a length in the order of magnitude of the width of the manure slide.

6. The device according to claim 5, wherein the two legs have a length that is greater than half, of the overall length of the device.

7. The device according to claim 1, wherein the greatest dimension of the accommodation space in a longitudinal direction of the device amounts to the order of magnitude of the width of the manure slide.

8. The device according to claim 1, wherein the drive is located in a central longitudinal plane of the device.

9. The device according to claim 1, wherein the drive comprises a single wheel.

10. The device according to claim 1, further comprising a frame, wherein the drive is fastened to the frame by a first connection, wherein the manure slide is fastened to the frame by a second connection, wherein the second connection is located behind the first connection.

11. The device according to claim 10, wherein the second connection forms a parallelogram connection.

12. The device according to claim 10, wherein the second connection comprises a hinge with a substantially horizontal centre line transverse to the longitudinal direction.

13. The device according to claim 12, wherein the second connection has only one horizontal hinge centre line.

14. The device according to claim 13, wherein the hinge is located on the manure slide.

15. The device according to claim 10, wherein the second connection engages the manure slide in at least two locations, which are in transverse direction at a distance from each other.

16. The device according to claim 10, wherein the second connection engages the manure slide by a hinge connection, wherein the hinge connection has a substantially horizontal rotational centre line that is perpendicular to a central longitudinal plane of the device, wherein the sliding wall has an upper edge, wherein the rotational centre line is located below at least a portion of the upper edge of the manure slide.

17. An unmanned self-propelled and self-steering device for removing manure present on a floor, comprising a manure slide with a sliding wall and a drive device for the travelling over the floor, wherein the device is self-steering, and wherein the drive device comprises a single, rotatingly driven drive that is configured to be in driving engagement with the floor, the drive being rotatable as a unit about a substantially vertical centre line, and wherein the drive also forms a steering member.

18. The device according to claim 17, wherein the drive is located in front of the sliding wall.

19. The device according to claim 18, wherein the manure slide forms a manure-accommodating-space that opens in forward direction and is confined in rearward direction by the sliding wall, wherein the drive is located within the accommodation space.

20. The device according to claim 19, wherein the manure slide forms a manure-accommodating-space that opens in forward direction and is confined in rearward direction by the sliding wall, wherein the drive is located near the opening of the manure-accommodating-space.

21. The device according to claim 20, wherein the accommodation space is substantially U-shaped or V-shaped.

22. The device according to claim 21, wherein the manure slide has two legs for forming the U-shape or V-shape, wherein the two legs have ends that extend to at least near the front of the device, wherein the drive is located behind the ends of the legs.

23. The device according to claim 22, wherein the two legs have a length in the order of magnitude of the width of the manure slide.

24. The device according to claim 22, wherein the two legs have a length that is greater than half, of the overall length of the device.

25. The device according to claim 22, wherein the legs of the manure slide are plate-shaped and the manure slide comprises a mechanism for mutual rotation of at least a portion of lower edges of the legs in a vertical plane in which the portion concerned is located.

26. The device according to claim 20, wherein the greatest dimension of the accommodation space in longitudinal direction of the device amounts to the order of magnitude of the width of the manure slide.

27. The device according to claim 17, wherein the drive is located in a central longitudinal plane of the device.

28. The device according to claim 17, wherein the drive comprises a single wheel.

29. The device according to claim 17, further comprising a frame, wherein the drive is fastened to the frame by a first connection, wherein the manure slide is fastened to the frame by a second connection, wherein the second connection is located behind the first connection.

30. The device according to claim 29, wherein the second connection comprises a hinge with a substantially horizontal centre line transverse to the longitudinal direction.

31. The device according to claim 30, wherein the second connection has only one horizontal hinge centre line.

32. The device according to claim 31, wherein the hinge is located on the manure slide.

33. The device according to claim 30, wherein the second connection forms a parallelogram connection.

34. The device according to claim 29, wherein the second connection engages the manure slide in at least two locations, which are in transverse direction at a distance from each other.

35. The device according to claim 29, wherein the second connection engages the manure slide by a hinge connection, wherein the hinge connection has a substantially horizontal rotational centre line which is perpendicular to a central longitudinal plane of the device, wherein the sliding wall has an upper edge, wherein the rotational centre line is located below at least a portion of the upper edge of the manure slide.

* * * * *